United States Patent [19]

Marshall, Sr.

[11] 4,071,260
[45] Jan. 31, 1978

[54] EASY CAB ENTRY AND EXIT

[76] Inventor: James A. Marshall, Sr., 106-17 Corona Ave., Corona, N.Y. 11368

[21] Appl. No.: 729,655

[22] Filed: Oct. 5, 1976

[51] Int. Cl.² ............................................. B60R 3/02
[52] U.S. Cl. ................................. 280/166; 214/75 T
[58] Field of Search ..................... 280/166, 163, 164; 214/75 T, 77 P

[56] References Cited

U.S. PATENT DOCUMENTS

| 3,520,426 | 7/1970 | Hostetler | 214/75 T |
| 3,951,431 | 4/1976 | Hopkins | 280/166 |
| 3,986,724 | 10/1976 | Rivinius | 280/166 |

Primary Examiner—Robert R. Song
Attorney, Agent, or Firm—Richard L. Miller

[57] ABSTRACT

A footstep carried by a cab of a large automotive truck so that a driver of the vehicle can more easily step up or step down between the cab and ground; the footstep being vertically movable so to minimize a stepping distance; the device including a hydraulic or pneumatic powered cylinder having a slidable piston to which the footstep is rigidly secured.

2 Claims, 4 Drawing Figures

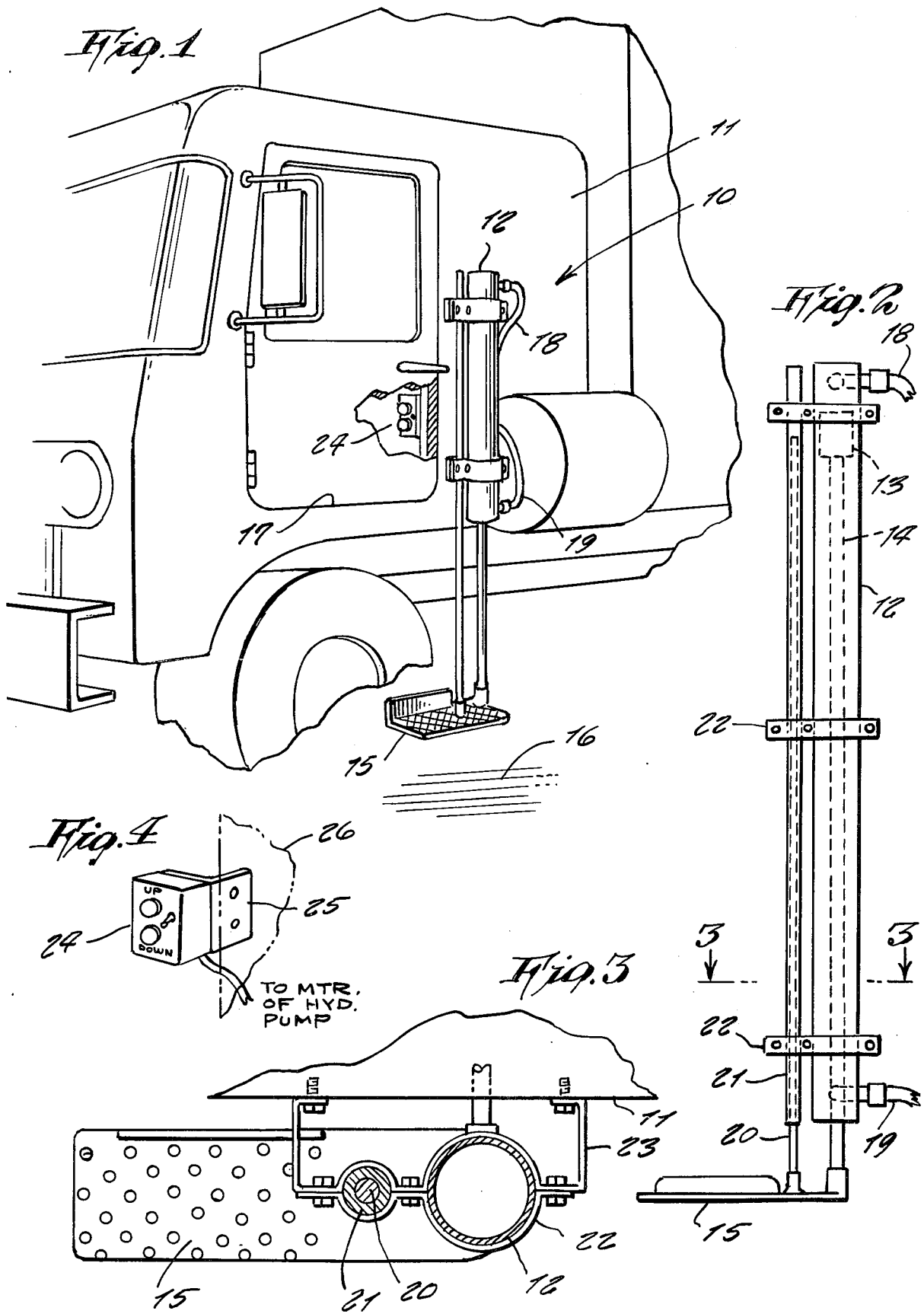

EASY CAB ENTRY AND EXIT

This invention relates to steps for large trucks, and which are used by a driver to step up into a cab or step down to the ground.

It is well known that at the present time women are entering professions which heretofore employed only men. One such field is truck driving. In view that many of the trucks are huge with cabs correspondingly large, the driver is obliged to step up very high so to reach the running board step located between the ground and the cab doorway. This is particularly difficult for women as they are generally not as tall as men, so that this situaion is therefore in want of an improvement. There also exists the matter that many male truck drivers are short in stature so that it is also difficult for them to climb up the running board or fender step.

Accordingly, it is a principal object of the present invention to provide as cab entry and exit step that is particularly suitable for shorter persons to climb up or down from a cab of a large truck such as is often seen for earth moving, forestry log moving, and other heavy industries.

Another object is to provide an easy cab entry and exit wherein the footstep is vertically movable so to carry the driver closer to a cab doorway or to a ground, thus eliminating the need of taking a high step up or down.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a perspective view of the invention mounted on a truck cab, and showing the truck door partly broken away so to illustrate the control switch mounted inside the cab near the door entrance.

FIG. 2 is a side elevation view of a design of the invention which includes a guide rod so as to prevent rotation.

FIG. 3 is a view in direction 3—3 of FIG. 2.

FIG. 4 illustrates the control unit inside the cab.

Referring now to the drawing in greater detail, the reference numeral 10 represents an easy cab entry and exit according to the present invention, where the same comprises an accessory mountable outside of a truck cab 11 and which is located outside thereof.

The accessory 10 includes a cylinder 12 rigidly secured to the cab 11 and which is powered either hydraulically or pneumatically so to move a piston 13 vertically upwardly or downwardly. A piston rod 14 extending out of a lower end of the cylinder is secured rigidly to a foot step 15 upon which a driver may step with his foot when wishing to step up from a ground 16 to a doorway opening 17, or else stepping downward therefrom to the ground.

Lines 18 and 19 to the upper and lower ends of the cylinder allow oil or air to move in or out of the cylinder, and are powered by a pump driven by an electric motor, not shown.

In order that the foot step 15 does not rotate about a vertically axis, the foot step is also rigidly affixed to a rod 20, parallel and spaced alongside the cylinder, the rod 20 being slidable in a pipe 21 which is rigidly secured together with the cylinder to the cab by means of brackets 22 and 23.

The electric motor for the oil or air pump is in an electric circuit with the truck battery, and which is controlled by a switch unit 24 secured on a bracket 25 mounted on an inside wall 26 of the cab and located adjacent the doorway 17.

Thus in operative use, in order for a driver to easily climb up into the cab, he simply steps upon the foot step 15 so to reach door handle 27 and open the door 28 so to operate the switch unit. By depressing the "up" button, the foot step thus is raised upwardly to an elevation so to easily step inside the cab. To descend, he depresses the "down" button.

Thus an easy cab entry and exit device is provided.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An easy cab entry and exit device comprising in combination, a cab for an automotive truck, and an accessory mounted outside said cab said accessory including a stationary cylinder, a vertically slidable piston inside said cylinder, a piston rod out of a lower end of said cylinder being affixed to a foot plate, power means for moving said piston including a pump driven by an electric motor in circuit with a battery of said truck and a switch unit inside said cab, wherein a rod parallel to said piston rod is affixed to said foot step, said rod being slidable in a pipe stationarily positioned alongside said cylinder.

2. The combination as set forth in claim 1 wherein said foot plate is movable between a position close to a ground and a position close to a doorway of said cab.

* * * * *